Figure 5:
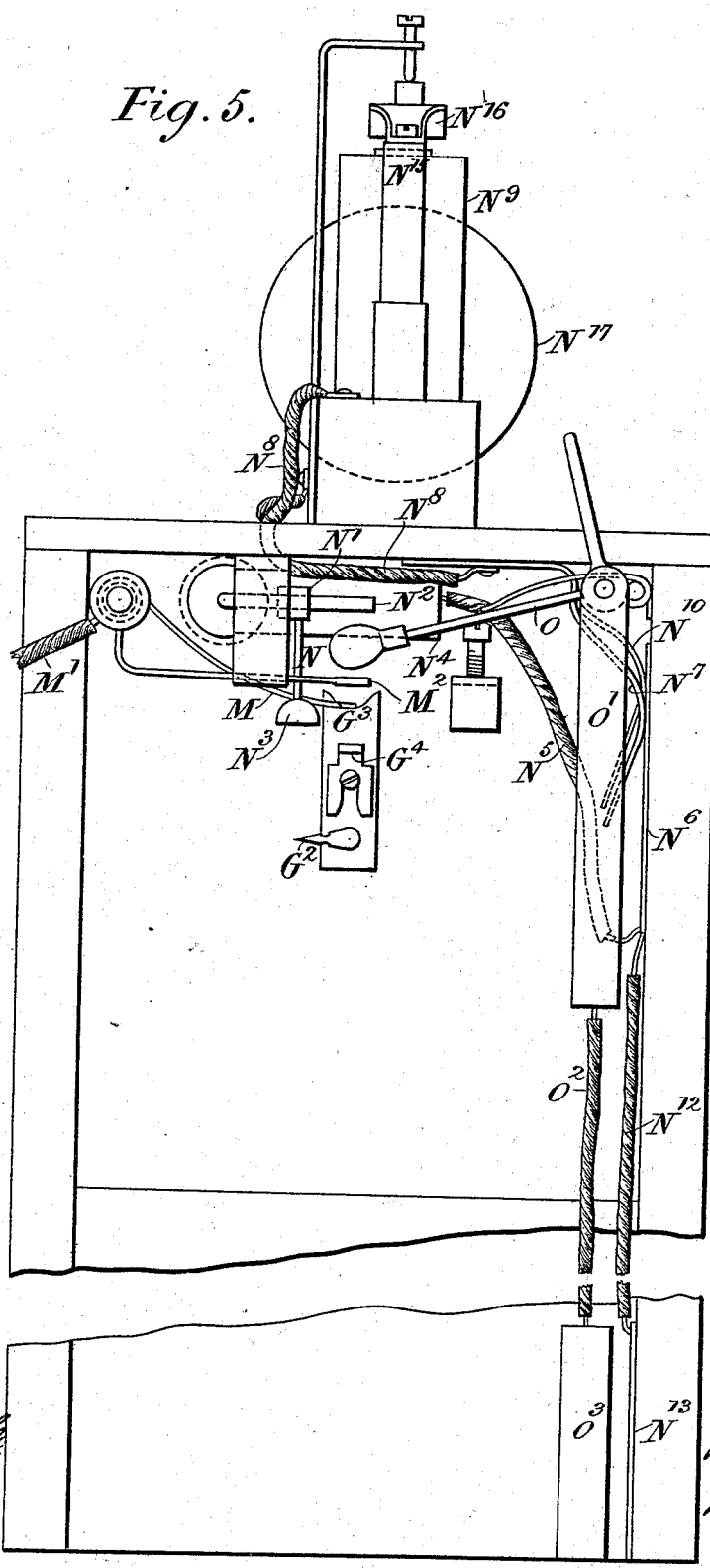

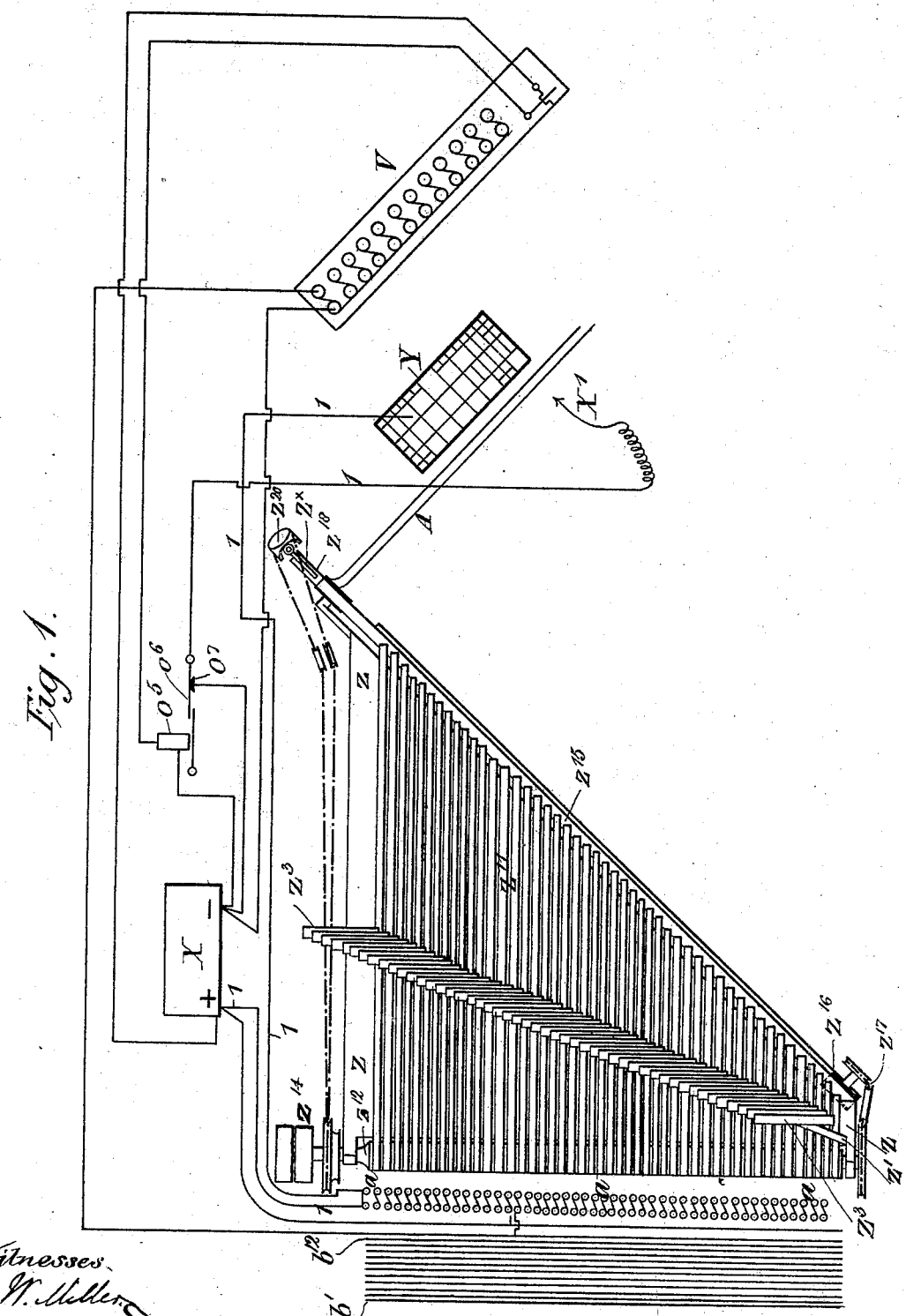

(No Model.)  
J. HOOKER.  
INDICATOR MECHANISM FOR TYPE SETTING MACHINERY.  
No. 505,200. Patented Sept. 19, 1893.
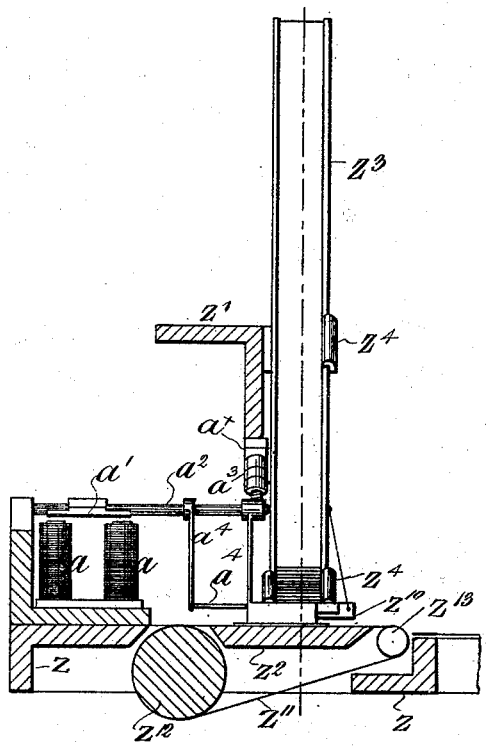
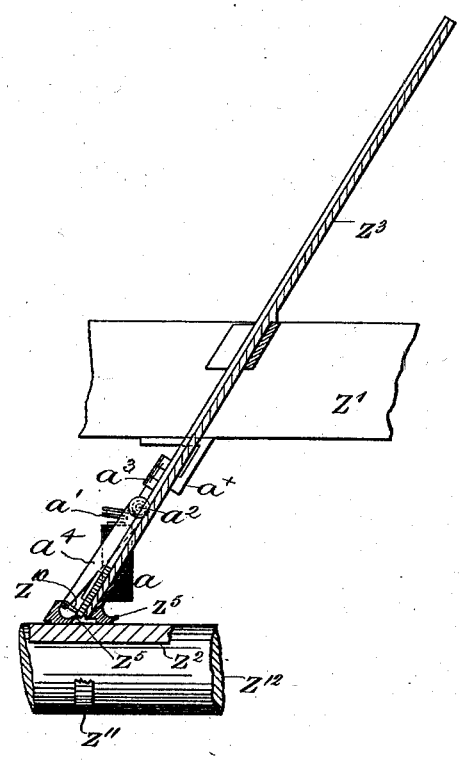

(No Model.)
21 Sheets—Sheet 3.
J. HOOKER.
INDICATOR MECHANISM FOR TYPE SETTING MACHINERY.
No. 505,200.
Patented Sept. 19, 1893.
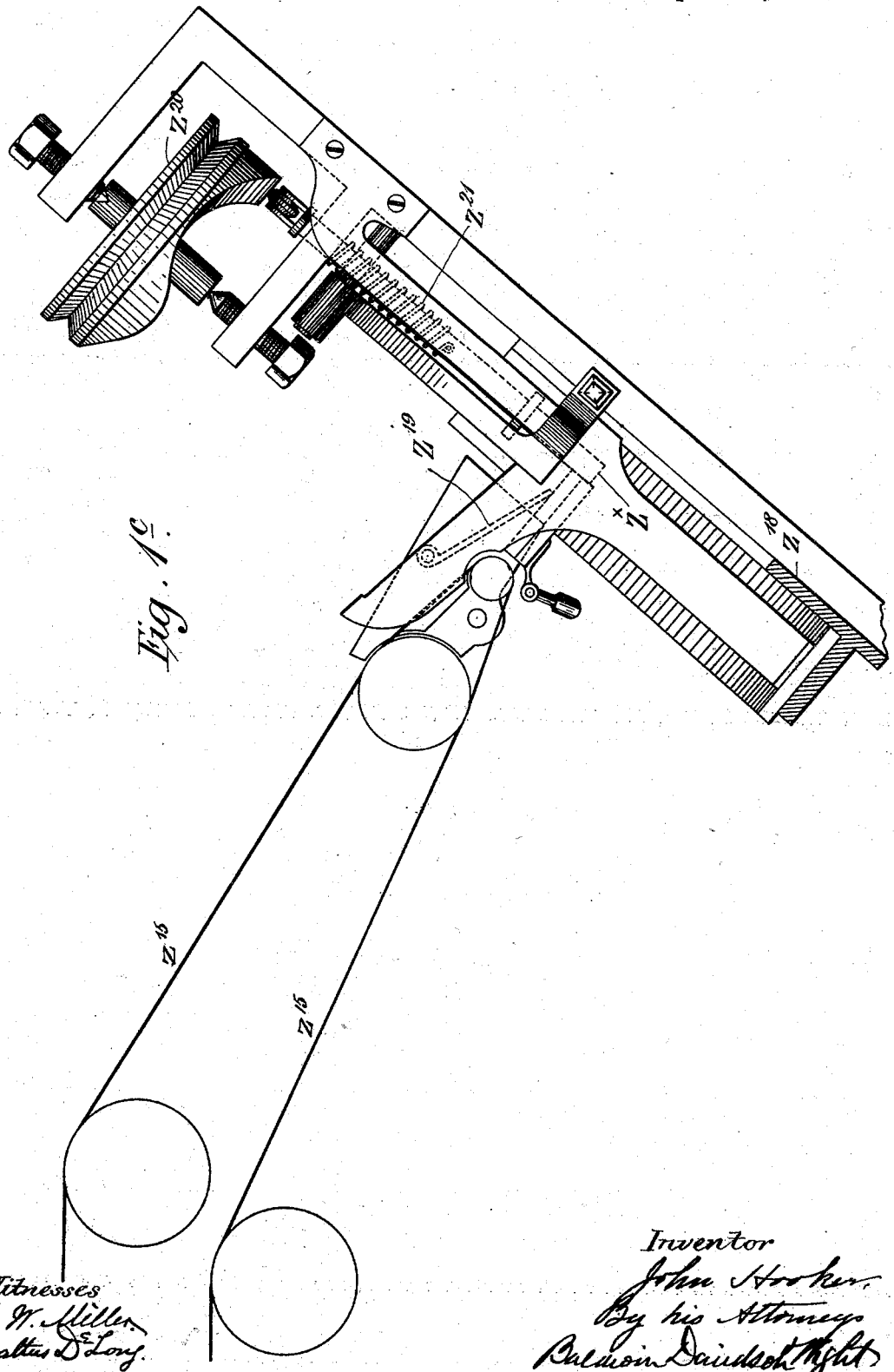

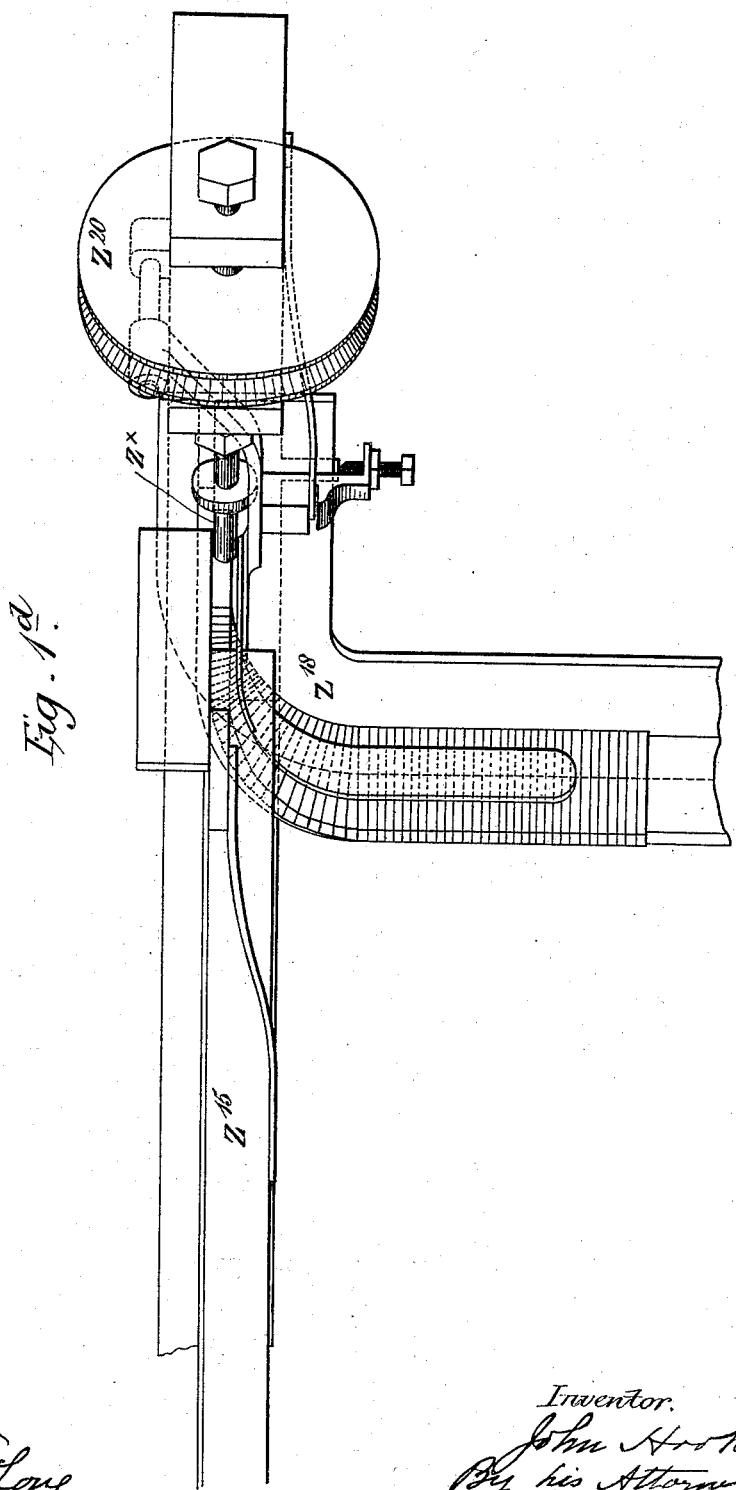

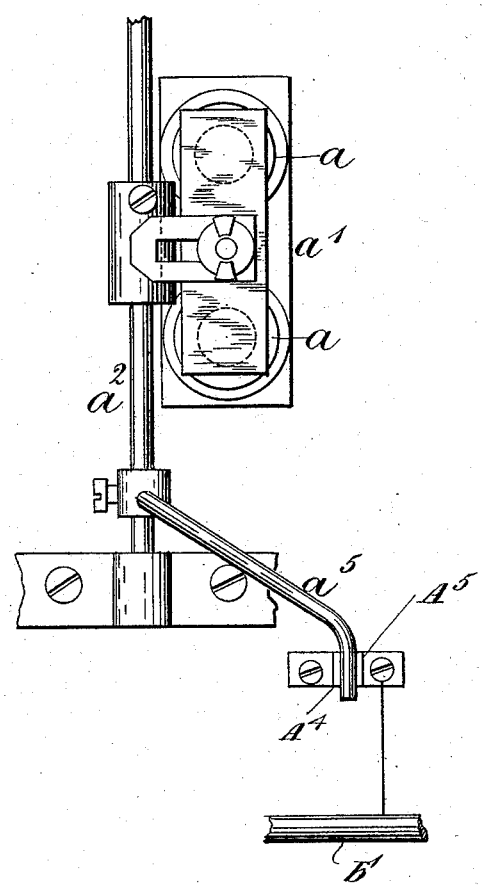

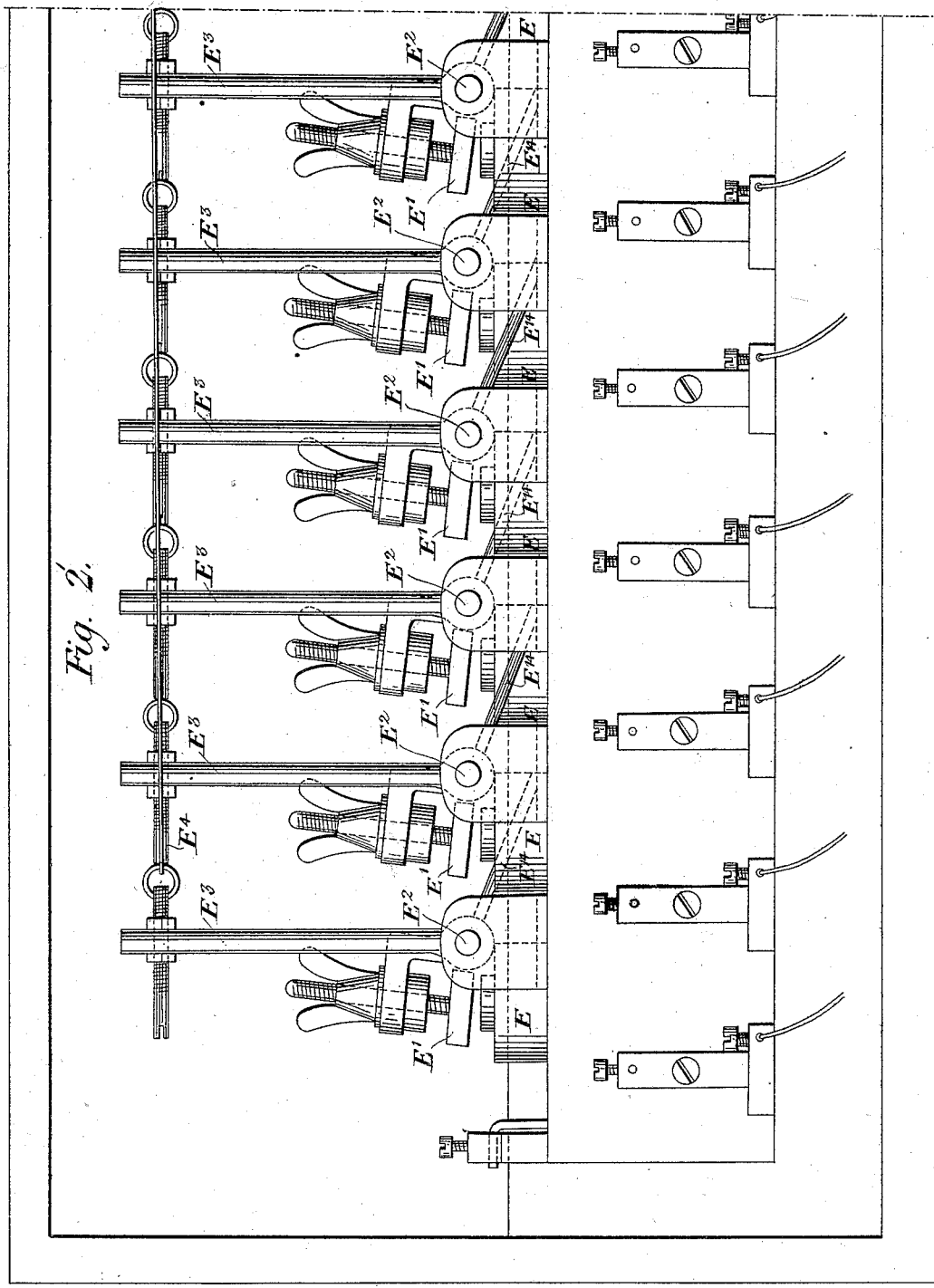

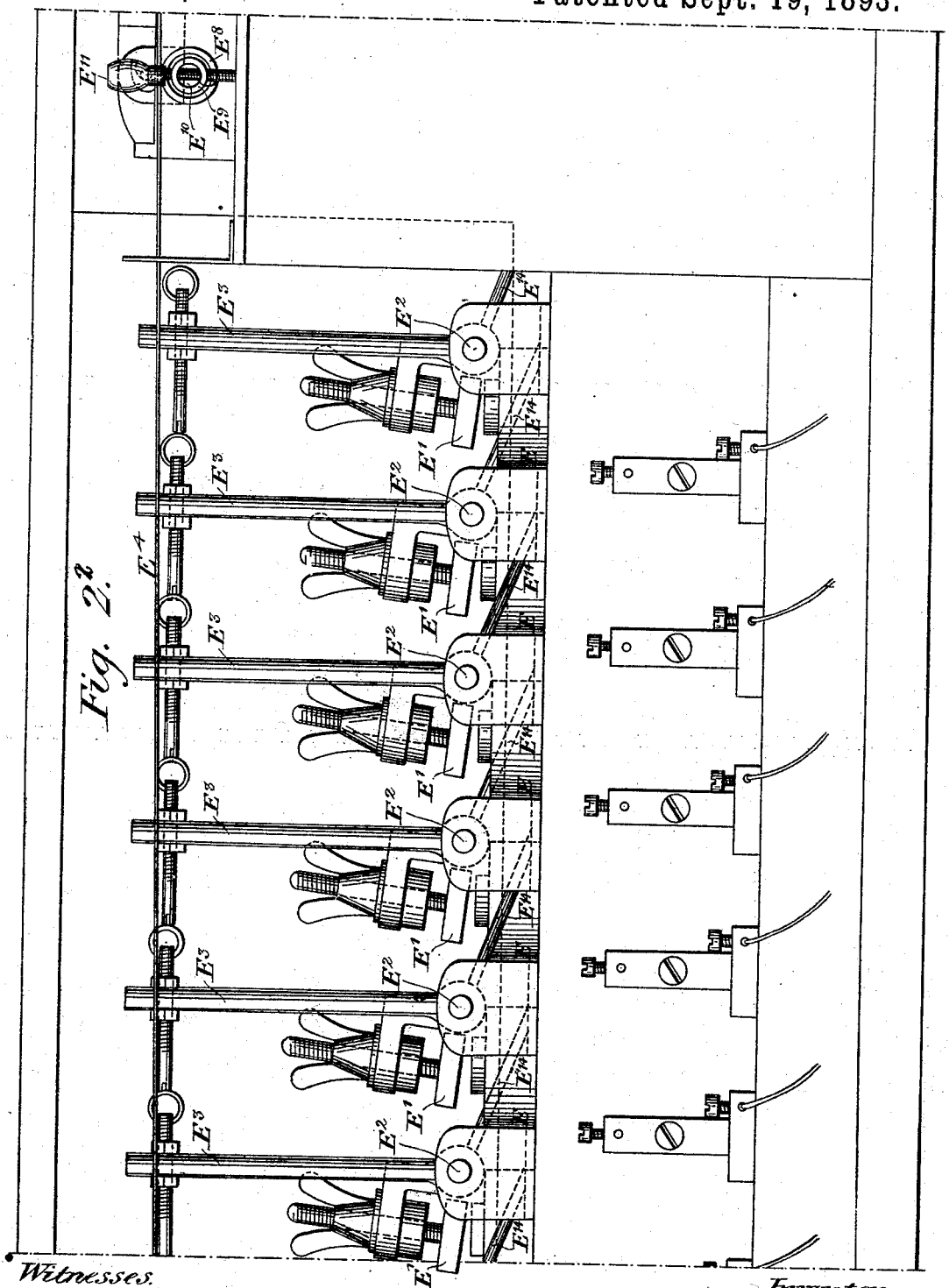

(No Model.)
J. HOOKER.
INDICATOR MECHANISM FOR TYPE SETTING MACHINERY.
No. 505,200. Patented Sept. 19, 1893.
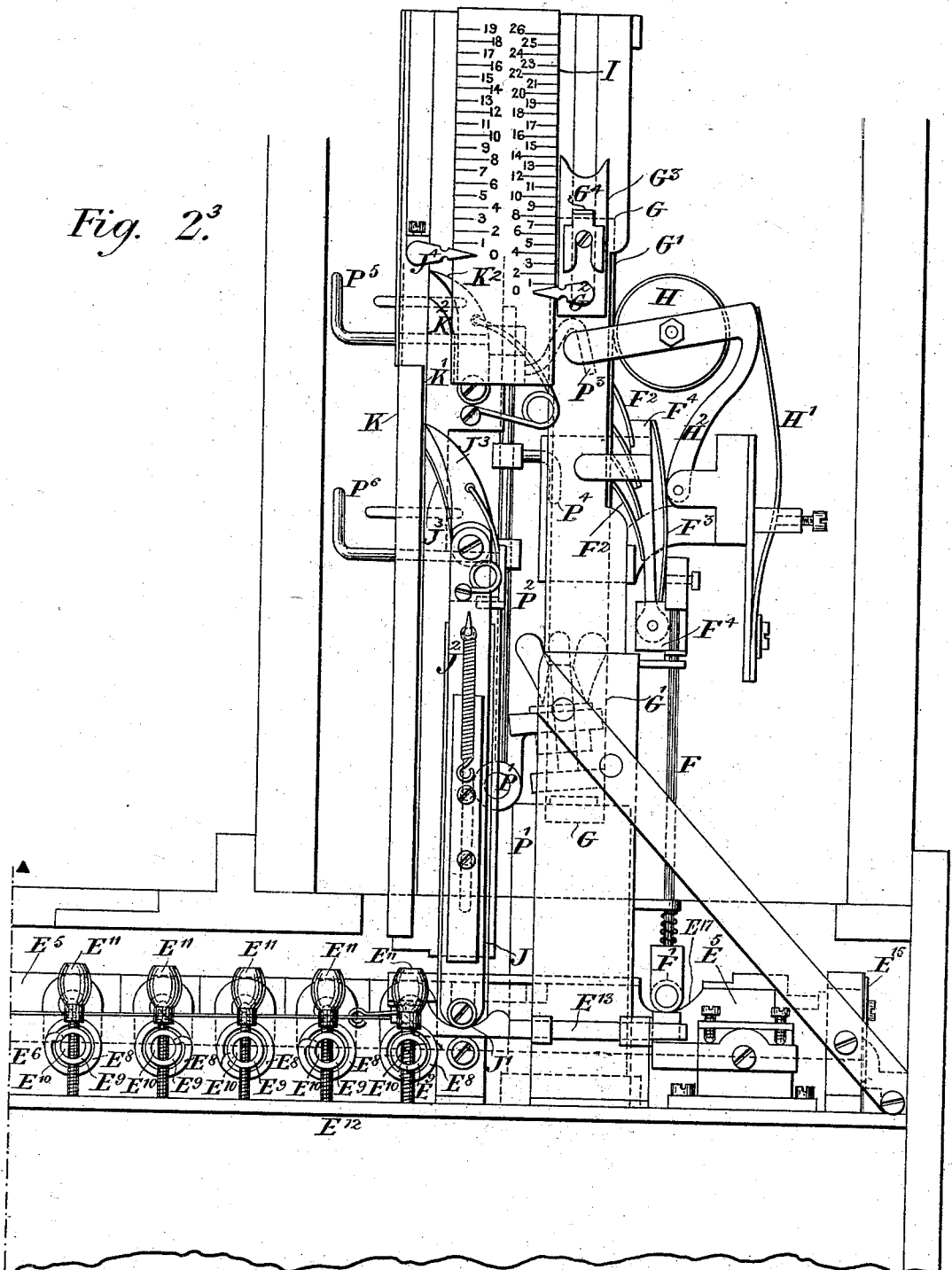
Fig. 2.³

(No Model.)  J. HOOKER.  21 Sheets—Sheet 9.
INDICATOR MECHANISM FOR TYPE SETTING MACHINERY.
No. 505,200.  Patented Sept. 19, 1893.
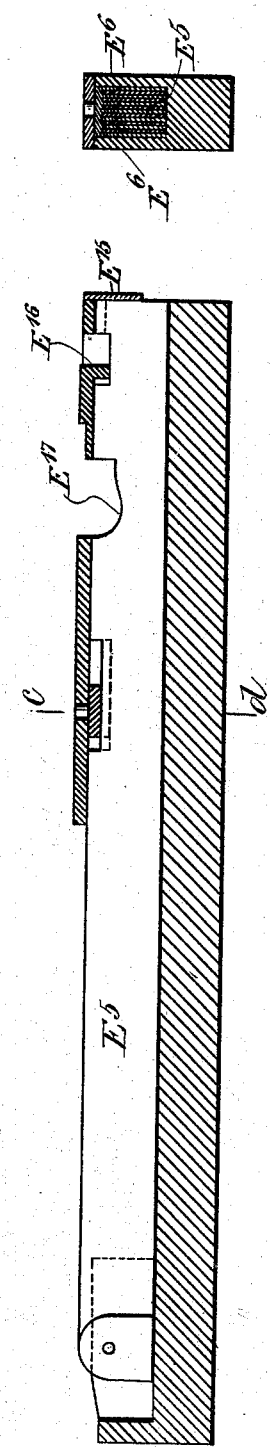

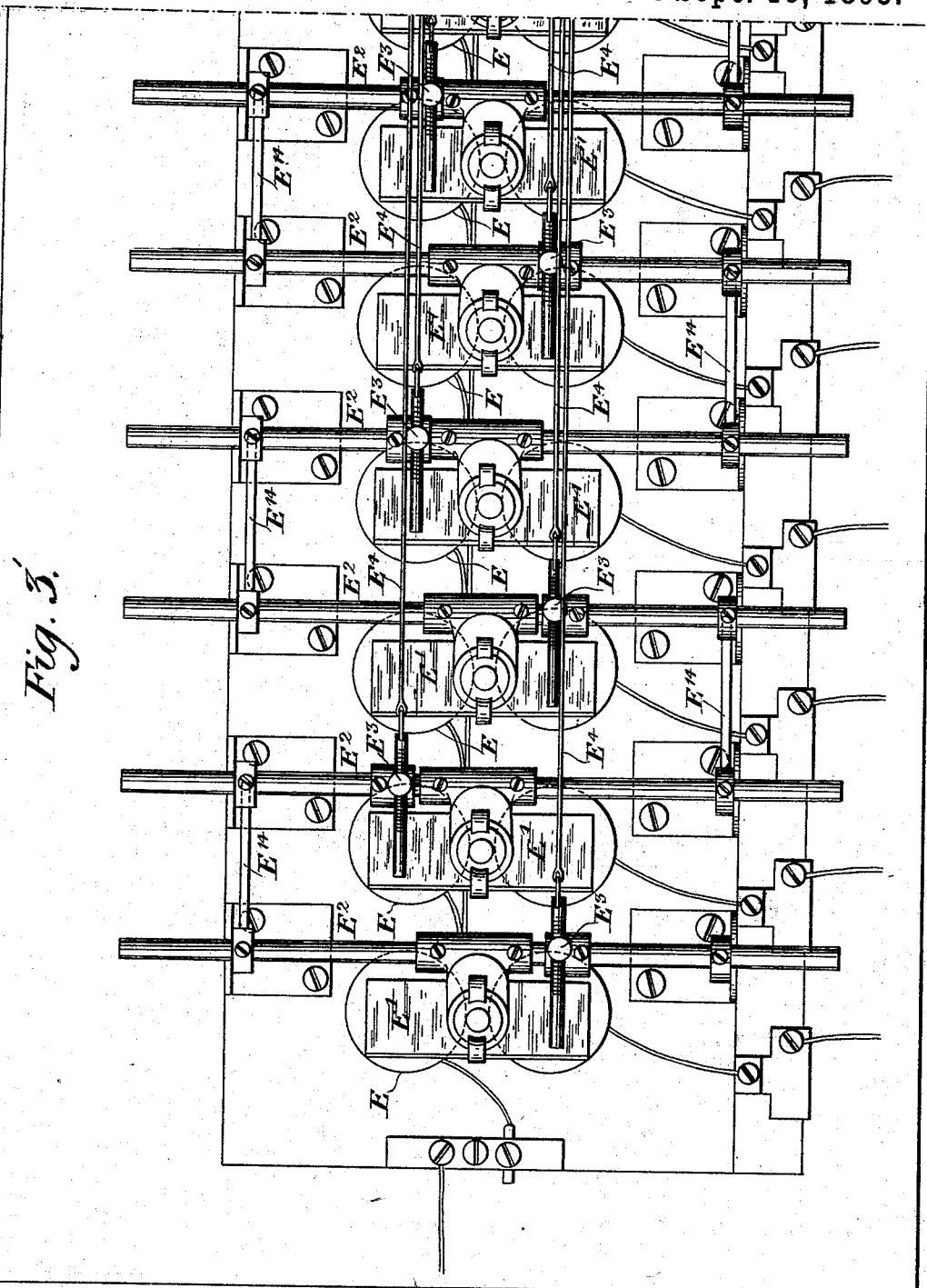

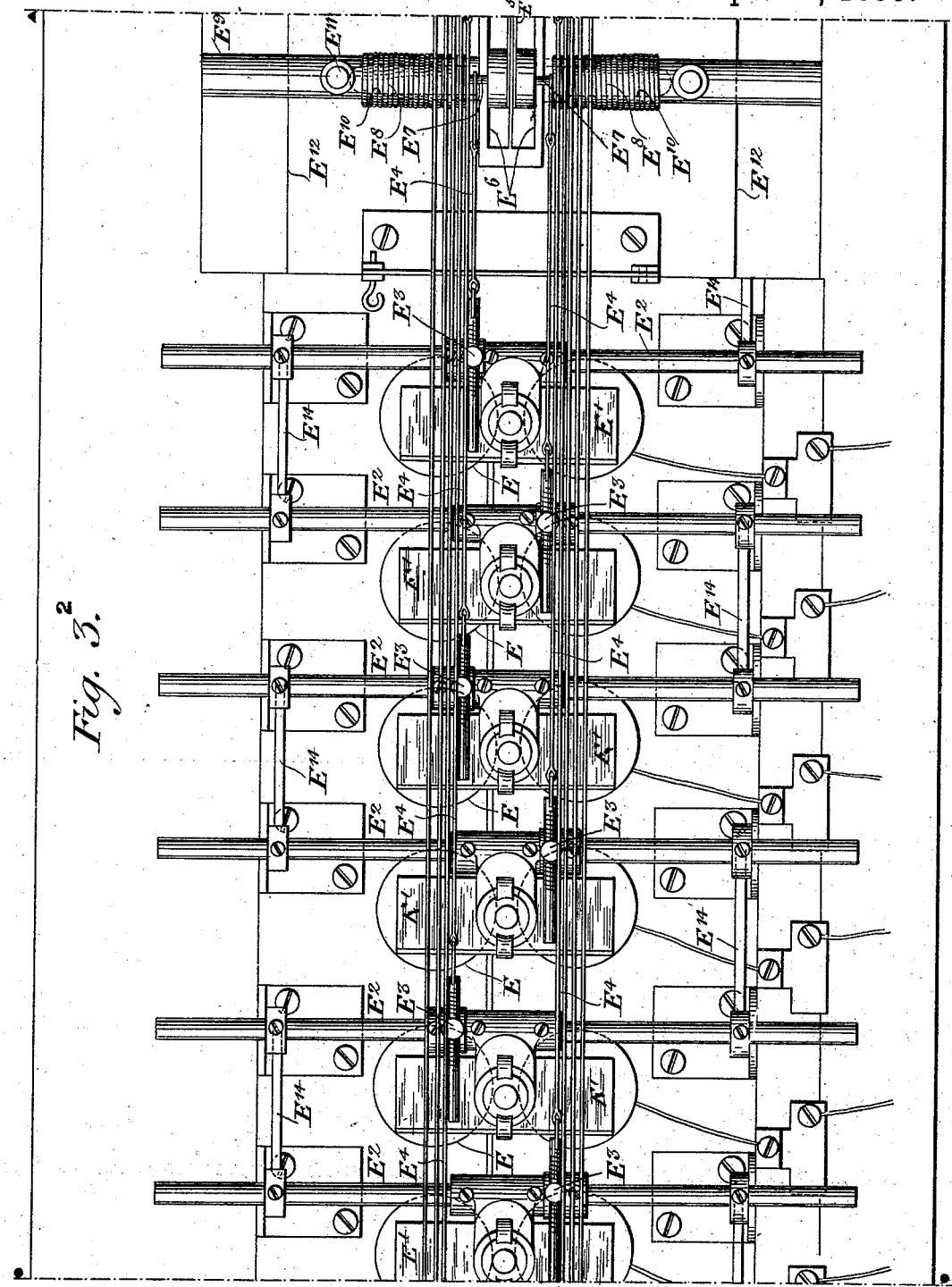

(No Model.)

J. HOOKER.

INDICATOR MECHANISM FOR TYPE SETTING MACHINERY.

No. 505,200. Patented Sept. 19, 1893.

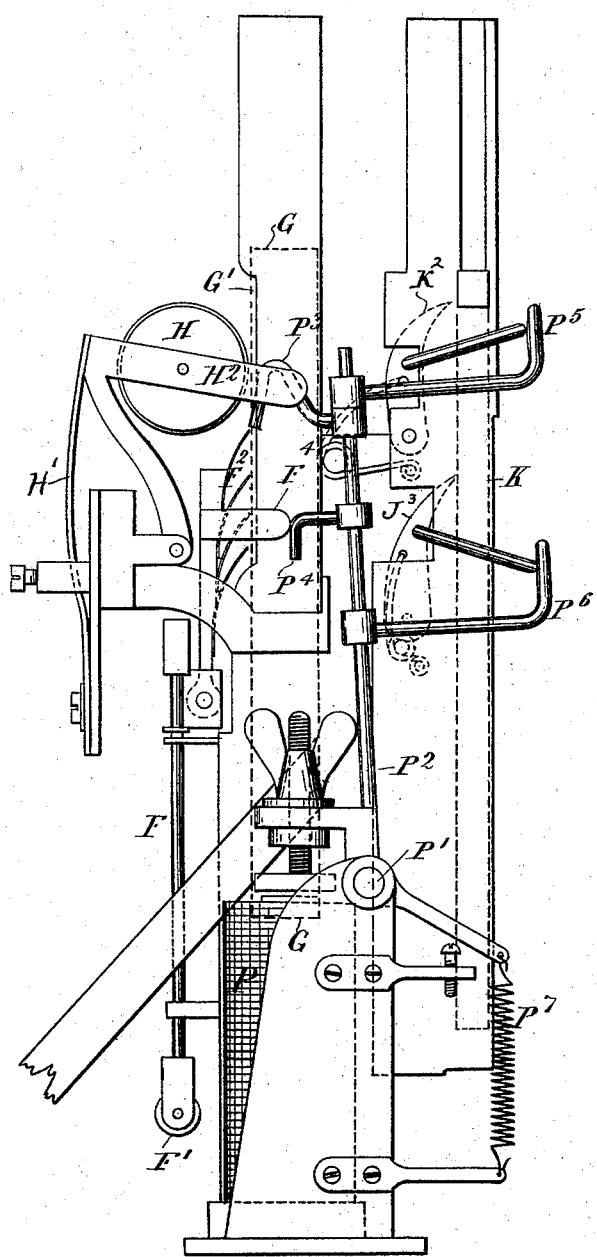

(No Model.)
21 Sheets—Sheet 14.
J. HOOKER.
INDICATOR MECHANISM FOR TYPE SETTING MACHINERY.
No. 505,200.  Patented Sept. 19, 1893.
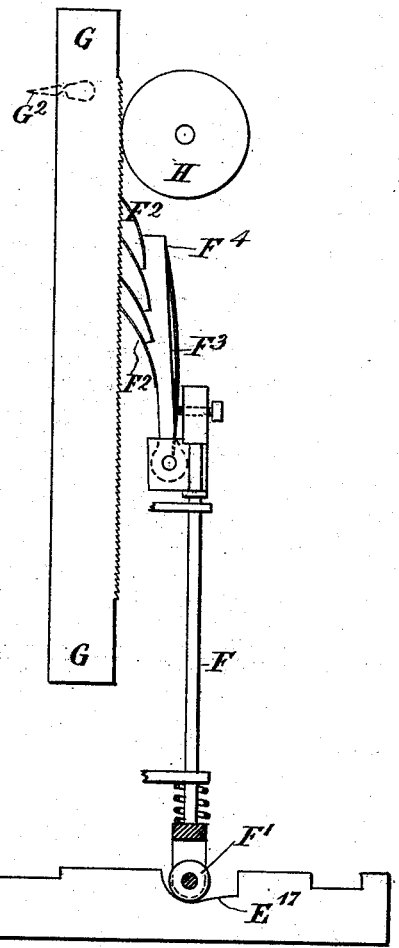
Fig. 4ᵃ
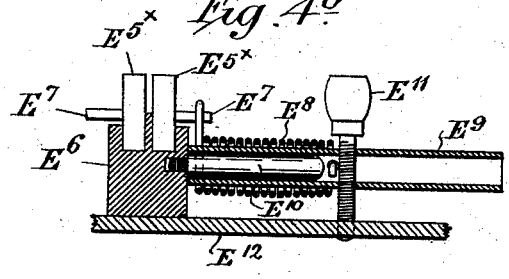
Fig. 4ᵇ
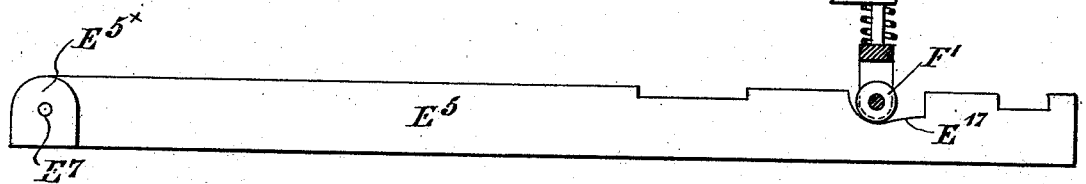
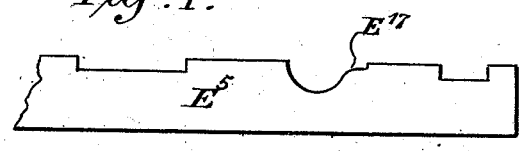
Fig. 4ᶜ
Witnesses.
B. W. Miller
C. M. Brooke
Inventor.
John Hooker,
By his Attorneys
Baldwin Davidson & Wight

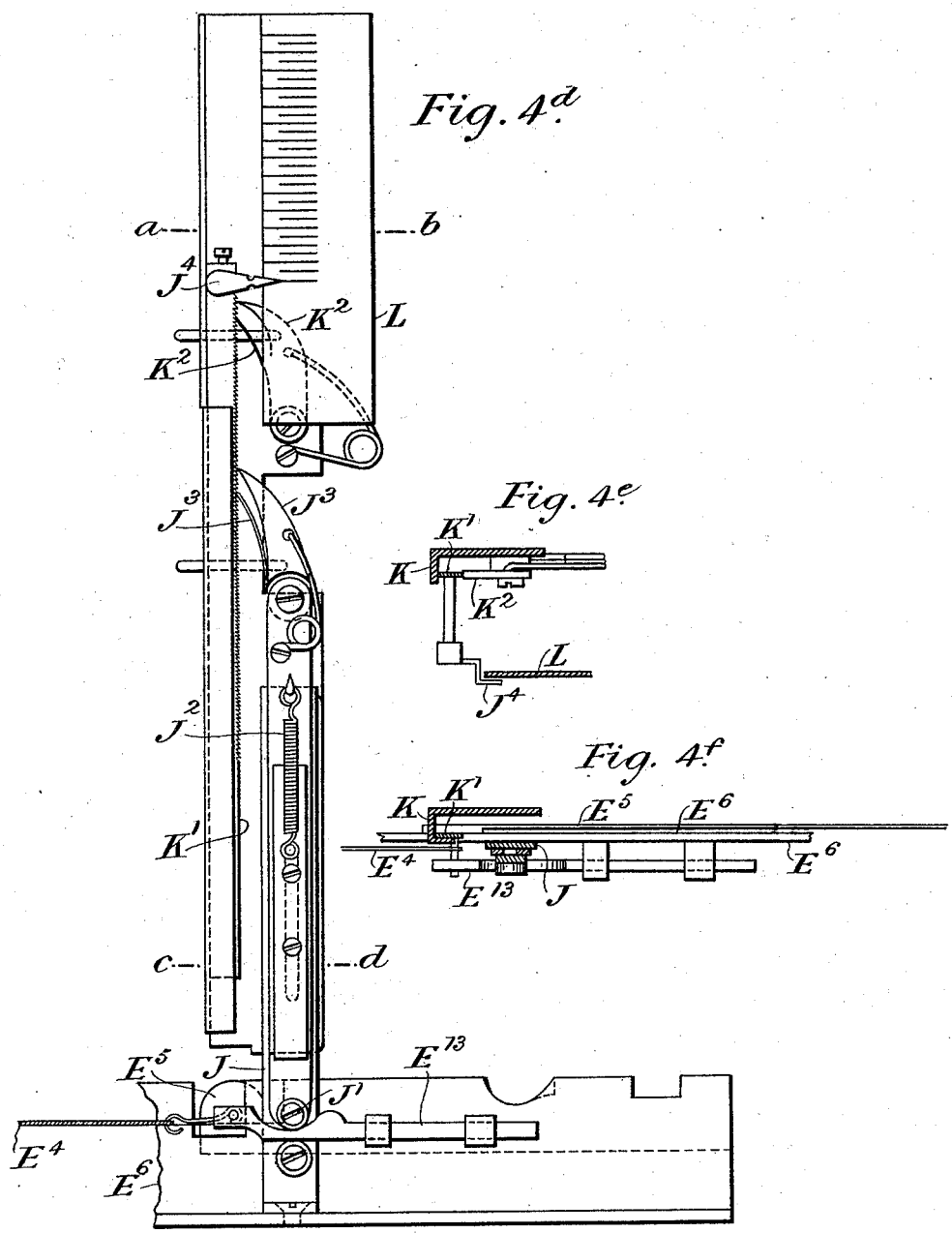

(No Model.)

J. HOOKER.
INDICATOR MECHANISM FOR TYPE SETTING MACHINERY.

No. 505,200. Patented Sept. 19, 1893.

Witnesses
C. W. Brooks
Baltus DeYong

Inventor
John Hooker
By his Atty's
Baldwin Davidson
& Wight

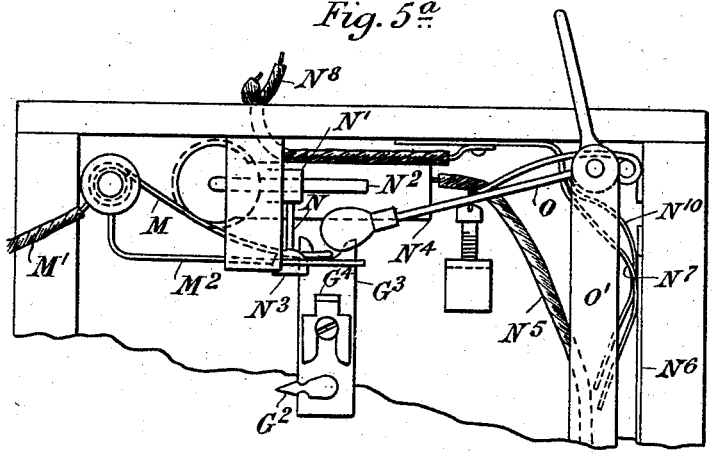
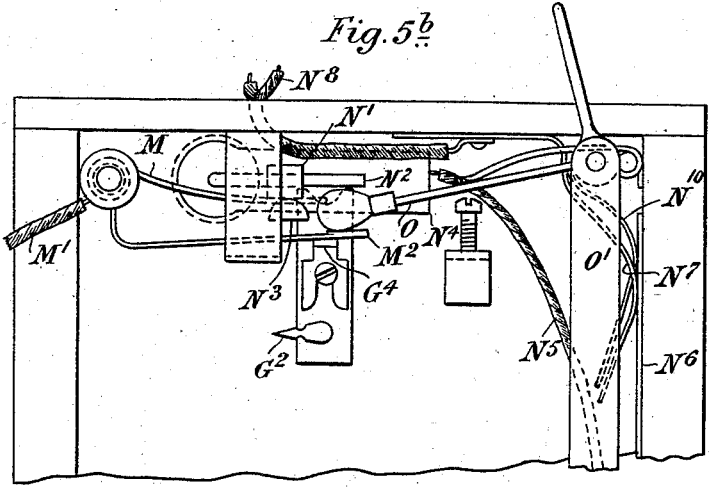
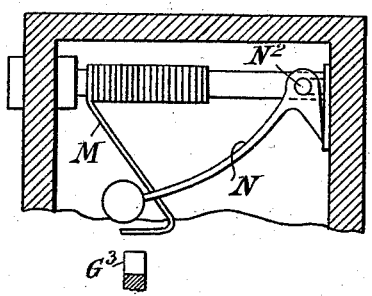
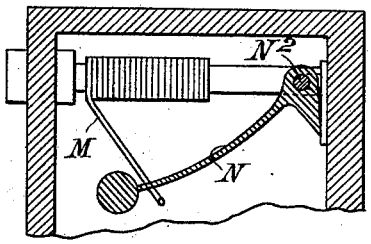

(No Model.) 21 Sheets—Sheet 18.
J. HOOKER.
INDICATOR MECHANISM FOR TYPE SETTING MACHINERY.
No. 505,200. Patented Sept. 19, 1893.
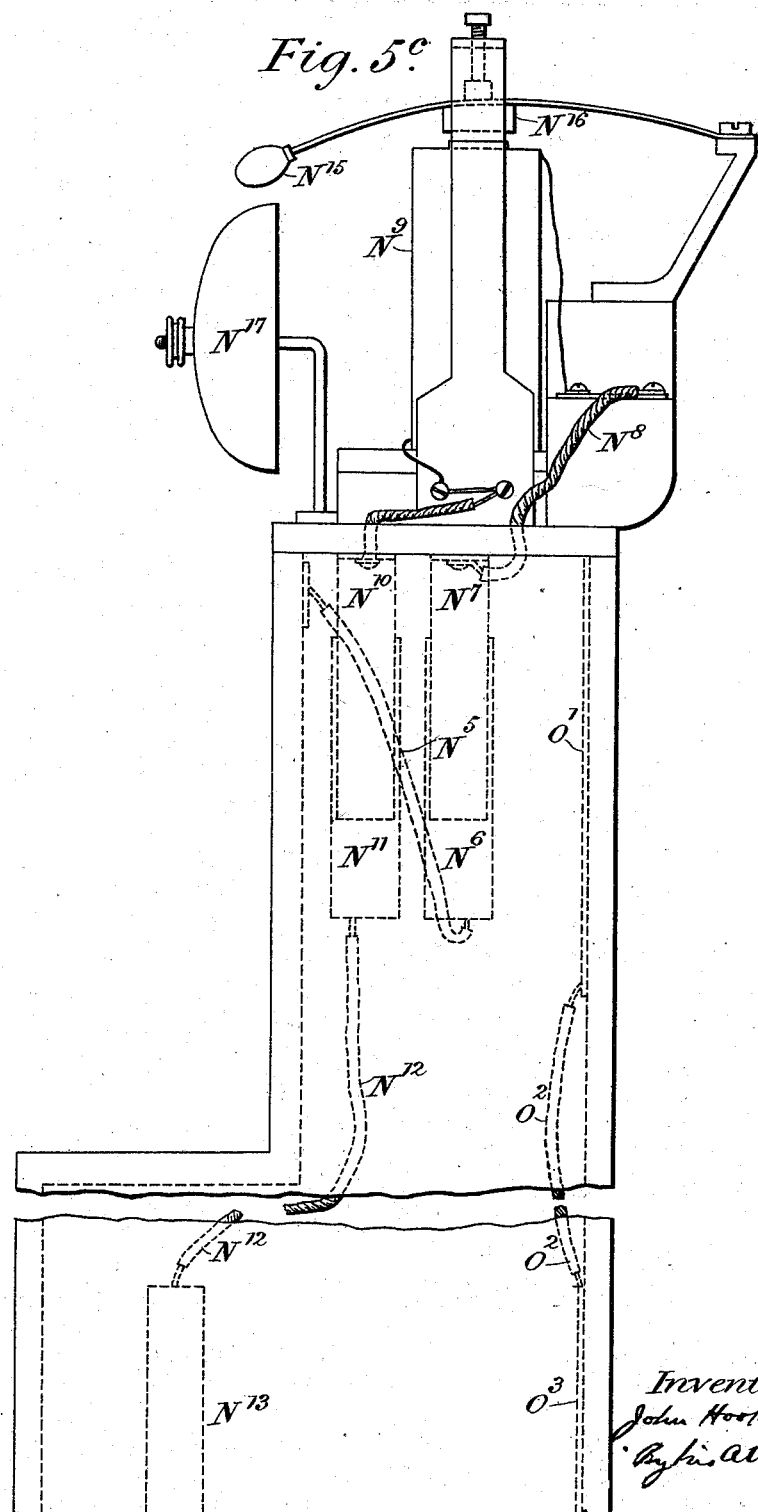
Fig. 5.c
Witnesses
C. W. Brooke
Baltus D. Long
Inventor
John Hooker,
By his Attys.
Bulson Davidson Wight (No Model.)
J. HOOKER.
INDICATOR MECHANISM FOR TYPE SETTING MACHINERY.
No. 505,200. Patented Sept. 19, 1893.
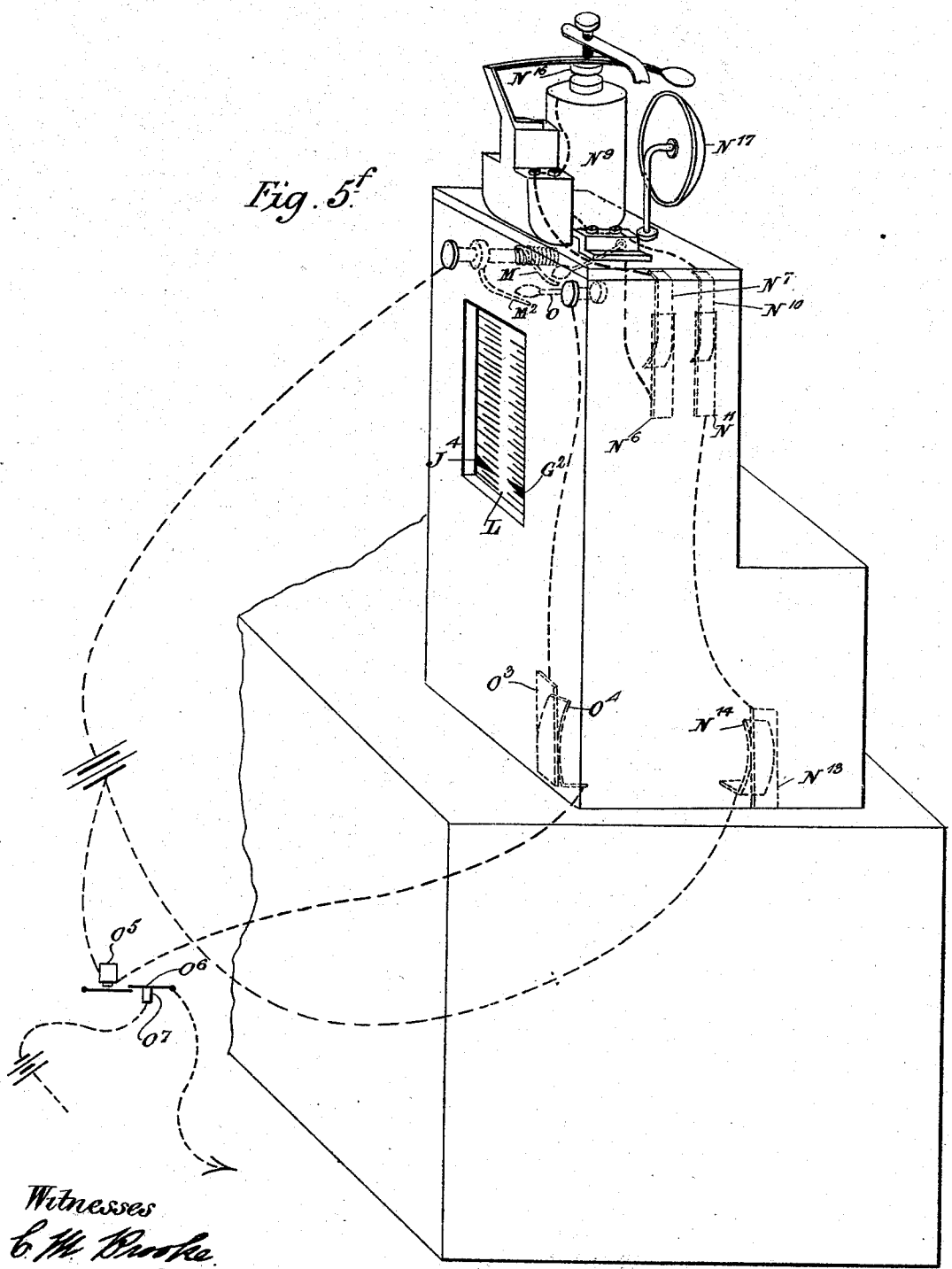

(No Model.)  21 Sheets—Sheet 20.
J. HOOKER.
INDICATOR MECHANISM FOR TYPE SETTING MACHINERY.
No. 505,200.  Patented Sept. 19, 1893.

(No Model.) 21 Sheets—Sheet 21.

J. HOOKER.
INDICATOR MECHANISM FOR TYPE SETTING MACHINERY.

No. 505,200. Patented Sept. 19, 1893.

Witnesses
B. W. Miller
C. W. Brooke

Inventor
John Hooker,
By his Attorneys
Baldwin Davidson & Wight

UNITED STATES PATENT OFFICE.

JOHN HOOKER, OF BECCLES, ENGLAND.

INDICATOR MECHANISM FOR TYPE-SETTING MACHINERY.

SPECIFICATION forming part of Letters Patent No. 505,200, dated September 19, 1893.

Application filed January 16, 1893. Serial No. 458,611. (No model.)

*To all whom it may concern:*

Be it known that I, JOHN HOOKER, printer, a subject of the Queen of Great Britain, residing at Lancaster Place, Station Road, Beccles, in the county of Suffolk, England, have invented certain new and useful Improvements in Indicator Mechanism for Type-Setting Machinery, of which the following is a specification.

In indicator mechanism such as described in my former application for patent Serial No. 412,814, difficulty is experienced in insuring that every time any one thickness of type is ejected from one or other of the type reservoirs of the type setting machine the indicator hand (used for indicating the total length of line) shall always be moved to the same extent.

The object of my invention is to construct indicator mechanism in such a way as to effectually insure this. I now give movement to the rack of ratchet teeth which carries the indicator hand by pawls carried on a bar to which an endwise movement is given by inclines on a number of thin plates—one plate with a suitable incline upon it for each thickness of type—and I employ a stop or stops which arrest the movement given to the plates so that when the armature of the electro magnet used for giving movement to the plate is attracted the plate must of necessity always be moved a given distance. I also apply electrical contact mechanism by which warning is given when any line is approaching completion and other contact mechanism by which if from any reason in spite of the warning given the line should be made of too great a length the further delivery of type from the type setting mechanism is arrested. The setting up machine is constructed as heretofore and is described in a former application for patent Serial No. 412,814.

Figure 6:
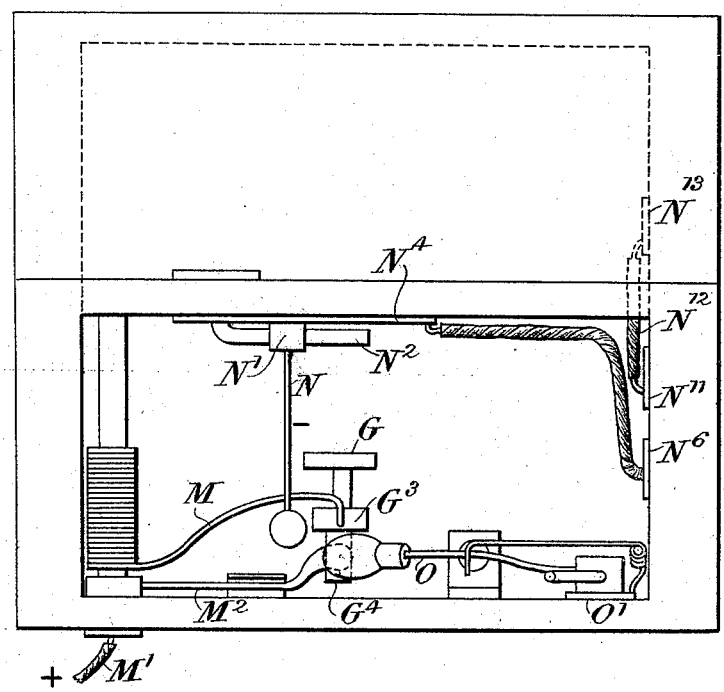
Figure 7:
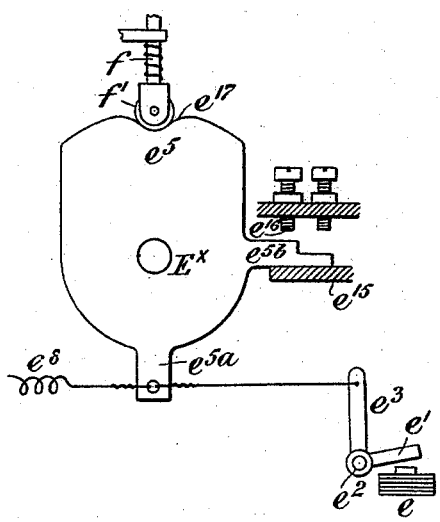
Figure 8:
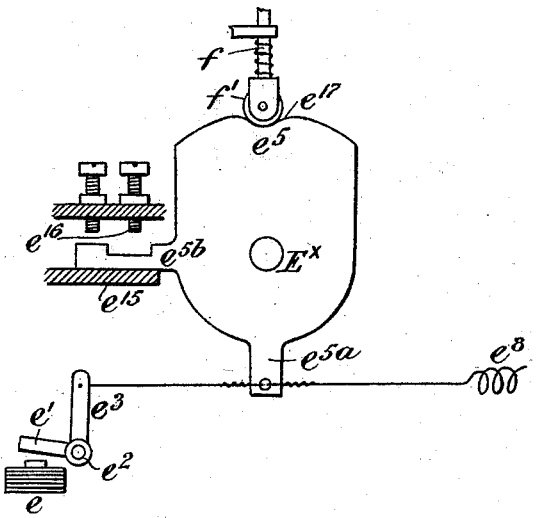
Figure 9:
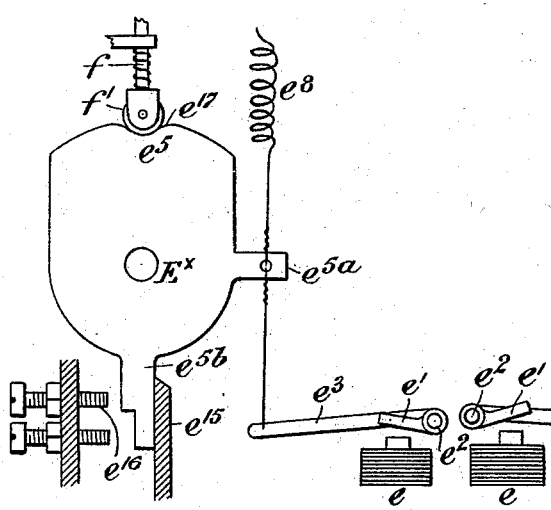
Figure 10:
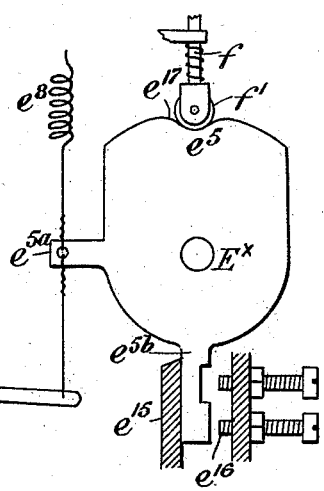

Figure 1 is a diagram plan view of a machine constructed according to my invention. Figs. $1^a$, $1^b$ are vertical sections through one of the type reservoirs of the setting up machine and show the mechanism for discharging the type one by one from the bottom of the reservoir. Fig. $1^c$ is a side elevation and Fig. $1^d$ a plan (full size) of the mechanism by which the type discharged from the various type reservoirs are set up into one continuous line. Fig. $1^e$ is a plan view full size of one of the electro magnets by which the type are ejected from the type reservoirs and the contact mechanism by which when the magnet attracts its armature an electric circuit is completed through the coil of one of the electro magnets of the indicator. Figs. 2 to 6 show the indicator mechanism for indicating to the operator the length of each line as it is being set up. Figs. $2'$, $2^2$, $2^3$ show a side view of the mechanism. Fig. $2'$ shows the left-hand end, Fig. $2^2$, the central portion, and Fig. $2^3$, the right-hand end. Figs. $3'$, $3^2$ and $3^3$, show a plan with some of the parts removed. Fig. $3'$ shows the left-hand end, Fig. $3^2$, the central portion, and Fig. $3^3$, the right-hand end; Fig. 4, an opposite side elevation of some of the parts. Fig. $4^a$ shows separately a side elevation of the parts by which a step-by-step upward movement is given to the slide G. Fig. $4^b$ is a vertical section through one of the coiled springs $E^8$. Fig. $4^c$ shows separately part of one of the slides $E^5$. Fig. $4^d$ shows separately a side elevation of the parts by which a to and fro movement is given to the slide K. Fig. $4^e$ is a section through $a\,b$, Fig. $4^d$. Fig. $4^f$ is a section through $c\,d$, Fig. $4^d$. Fig. 5 is an elevation with the front removed of part of the casing of the mechanism, and contact mechanism carried with it. Fig. $5^a$ shows the position of the parts of the contact mechanism when the slide G has been raised high enough to bring the contact wire M against the contact arm N. Fig. $5^b$ shows the position of the parts when the slide G has been raised still farther and has brought the contact arm $M^2$ against the contact arm O. Fig. $5^c$ is an end elevation of the parts shown in Fig. 5. Fig. $5^d$ is a section of the upper part of the casing showing contacts M and N. Fig. $5^e$ is another section taken in the vertical plane of the contact arm N. Fig. $5^f$ is a perspective view of the mechanism showing in a diagrammatic manner the alarm and the arresting circuits. Fig. 6 is a plan with the top removed. Fig. $2^a$ is a longitudinal section of the trough which contains the plates or slides. Fig. $2^b$ is a cross section through the line $c\,d$, Fig. $2^a$. Figs. 7 to 10 show a modification in which plates rocking on axes are used instead of endwise moving slides.

The setting up machine is constructed as described in my former application for patent.

Z is a horizontal triangular frame supported upon legs or other supports. Z' is a bar passing across this frame and supported at its ends by uprights from the frame Z. $Z^2$ is a bar also passing across the frame and parallel with the bar Z'.

$Z^3$ are reservoirs containing type. They slide into guides $Z^4$ fixed to the bars Z' $Z^2$. A projection on the back of each rests on the top of one of the guides $Z^4$ and the reservoirs are so upheld in place.

$Z^5$ are tail pieces at the back of the lower guides $Z^4$. The lowest type in the reservoirs come down onto these tail pieces.

$a$ are electro magnets—one for each reservoir $Z^3$. The armature $a'$ of each magnet is carried on a spindle $a^2$ and is normally held away from the magnet poles by the action of a weight or arm $a^3$. A stop $a^x$ prevents the weight dropping too far. Another arm $a^4$ on the same spindle carries at its lower end a small blade $Z^{10}$ (see Figs. $1^a$ and $1^b$) which serves to strike away the lowest type from the type reservoir whenever the armature is attracted by the magnet.

Y is a composing or contact table in front of which the operator is situated. It has upon it a number of square metallic plates all insulated from one another there being as many such contact plates as there are type reservoirs $Z^3$. From each plate an insulated wire is led to one end of the coils of one or other of the magnets $a$. From the other end of the magnet coils an insulated wire is led to one of the poles of a small dynamo or battery X. To the other pole of this dynamo or battery is connected a flexible insulated wire having at its end a metallic point or pencil X' which the operator holds in his hand. In this way when the operator touches one or other of the contact plates on the contact table Y an electric circuit marked 1 in Fig. 1 is completed through the coils of one or other of the magnets $a$ and a type is ejected from the bottom of the type reservoir $Z^3$ with which this magnet operates. The circuit for one of the magnets only is shown in Fig. 1.

$Z^{11}$ are endless tapes which pass below the reservoirs one below each reservoir. All the tapes pass around a roller $Z^{12}$. Each tape also passes around a small roller $Z^{13}$. These rollers are supported in brackets fixed to the top of the long side of the triangular frame Z. The roller $Z^{12}$ has a continuous revolving motion imparted to it by an endless driving band working over a pulley $Z^{14}$ on its end.

$Z^{15}$ is another endless tape supported for the most part parallel with the long side of the frame. The roller $Z^{16}$ around which it passes at one end of this side of the frame is driven continuously by an endless cord $Z^{17}$ from a pulley on the roller $Z^{12}$. The type as they are ejected one by one from the reservoirs $Z^3$ drop on to the tapes $Z^{11}$ which deliver them on to the endless tape $Z^{15}$ and this tape delivers them one after the other on to an inclined plate $Z^{18}$ down which they slide to be put into line in the channel A. The way in which the type are put into line is best seen in Figs. $1^c$ and $1^d$. The type as they pass off the band $Z^{15}$ come above the uppermost type previously contained in the channel A. As they do so they come below a light hinged plate $Z^{19}$ which rests upon them and keeps them from rebounding. When they have dropped into the channel they are pushed downward along it by a constantly reciprocating pusher $Z^x$. The pusher is moved in one direction by a revolving cam $Z^{20}$ and in the opposite direction by a spring $Z^{21}$. Any type which as indicated in Fig. $1^c$ may come against the side of the pusher when it is making its forward stroke will slide down into proper position in the channel when the pusher retires. The cam $Z^{20}$ is revolved continuously by an endless cord passing around a pulley on its axis and also around a pulley on the axis of the roller $Z^{12}$ as shown in Fig. 1.

V is a casing containing the indicator mechanism for showing to the operator the length of the type line as each type is liberated from its reservoir. The construction of this mechanism is shown in Figs. 2 to 6.

The way in which the requisite electrical contacts are made for actuating the indicator is as follows:—The axes $a^2$ which carry the armatures $a'$ of the electro magnets $a$ have upon them arms $a^5$. When any axis $a^2$ is rocked by reason of the armature which it carries being attracted by its magnet the end of the arm $a^5$ descends between two contact springs $A^4$ $A^5$ which are insulated from one another and makes an electrical contact between them. The contact springs $A^4$ are all connected to one pole of a small dynamo or battery X. The contacts $A^5$ are connected to one or other of a series of conducting rods $b'$ to $b^{12}$. From each of these electrical conductors a wire is led to one end of the coils of one or other of a series of twelve electro magnets E of the indicator mechanism. The other end of the coil of each electro magnet is coupled to the other pole of the battery as shown in diagram Fig. 1. In this way whenever the end of any arm $a^5$ descends between any pair of contact pieces $A^4$ $A^5$ and puts them in electrical connection with one another a circuit is completed through one or other of the coils of the magnets E of the indicator.

To divide the continuous line of type set up by the composing machine into lines of the required length I use special spaces. The indicating mechanism is for indicating to the operator the times when it is necessary for him to cause these special spaces to be set up in line with the other type.

In Figs. 2 to 6 E are the electro magnets through the coil of one or other of which an electric circuit is completed whenever a type is ejected from one or other of the type reservoirs as above described and as is also described in my former patent. E' are the magnet armatures carried by axes $E^2$. On each axis is an arm $E^3$ connected by a wire $E^4$ with a thin slide $E^5$. The slides are all side by side parallel with one another and kept in place between two fixed parallel plates $E^6$. The slides are of different lengths as seen in Fig. $3^3$, so that they extend back to different distances and each has upon its rear end a projection $E^{5x}$, from which stands out a pin $E^7$ to which one or other of the wires $E^4$ is connected. Each slide is also pressed forward by the end of a coiled spring $E^9$ bearing upon its projecting pin $E^7$. The other end of each spring is attached to a tube $E^8$ which the spring surrounds as seen in Figs. $2^3$, $3^3$ and $4^b$. The tubes are supported upon rods $E^{10}$ which stand out from the plates $E^6$. By turning the tubes around the rods the force with which the springs press the slides forward can be adjusted and the tubes can then be held by screw pins $E^{11}$ passed through them and screwed into a fixed plate $E^{12}$ below them. One of the slides $E^5$ is coupled to a separate slide $E^{13}$ for a reason hereinafter explained. $E^{14}$ are arms on the axes $E^2$ to act as stops and prevent the armatures $E'$ from being jerked too far away from the magnets. $E^{15}$ is a stop to prevent the slides from being jerked too far forward by the springs $E^8$, and $E^{16}$ is a stop to prevent their being drawn too far in the opposite direction by the action of the electro magnets. The slides will therefore always be moved to and fro a uniform definite distance. Each slide has an inclined surface $E^{17}$ cut upon it. These inclines are at different angles on the several slides. Resting upon the inclines is a roller $F'$ which is at the lower end of a vertical slide F. This slide is constantly pressed downward by a coiled spring. The slide $E^5$, shown in Fig. $4^a$, is the slide which is moved whenever one of the thinnest type is delivered from the composing machine. The position of the slide $E^5$ shown in Fig. $4^c$, is a portion of the slide which is moved whenever one of the thickest type is delivered from the composing machine. It will be seen that the angle of the incline $E^{17}$ of the slide $E^5$, shown in Fig. $4^a$, is very slight, so that when the slide is drawn endwise a very short upward movement corresponding with the thickness of the thinnest type will be given to the vertical slide F, and that in Fig. $4^c$, the angle of the incline $E^{17}$ is much greater, so that when this slide is drawn endwise, the vertical slide F, will be raised a distance corresponding with the thickness of the thickest type. In the other slides the inclines are made at intermediate angles—one at twice the angle of the one shown in Fig. $4^a$, the next at three times that angle, and so on, according to the thickness of the various type used. In place of using a number of slides which are all moved an equal distance but have different inclines upon them, a single incline moved different distances by the various magnets might be used. $F^2$ are spring pawls carried by an arm $F^4$ jointed to the slide F and acted on by a spring $F^3$ to cause the spring pawls to engage with the ratchet teeth of narrow racks $G'$ which are fixed on a vertical slide G. H is a roller covered with vulcanized india rubber and pressed against the racks $G'$ by a spring $H'$ acting against the arm $H^2$ which carries the roller. Whenever any one of the slides $E^5$ is drawn endwise by the action of one of the electro magnets the slide F is raised a distance depending upon the angle of the incline $E^{17}$ on that slide. The pawls $F^2$ raise the slide G a corresponding distance the roller H offering no impediment to the slide being moved in this direction. When the slide $E^5$ is moved back to its former position by its spring $E^8$ the slide F is drawn down again by the spring but the slide G is upheld by the ratchet teeth of the racks $G'$ holding to the surface of the roller H. The slide G carries an index hand $G^2$ which shows on a fixed scale I the height to which the slide has been raised and this shows the length of type set up in the line. The slide $E^{13}$ which is coupled to and moves with one of the slides $E^5$ has an incline upon it to act against a roller $J'$ on the lower end of a slide J. The slide is drawn downward by a spring $J^2$. It also carries spring pawls $J^3$ which engage with the ratchet teeth of racks $K'$ on a slide K. When the slide J is raised by reason of the slide $E^{13}$ being drawn endwise the slide K is raised with it. When the slide J is drawn down again the slide K remains upheld by pawls $K^2$. The slide J carries an index hand or pointer $J^4$ which shows on a fixed scale L the height to which the slide K has been raised and this depends upon the number of spaces that have been put into the line. The movement of the slide $E^5$ to which the slide $E^{13}$ is attached consequently moves both pointers and records on one scale the insertion of a space and on the other it shows the extent to which the line has been lengthened by the insertion of that space.

In order to give warning when the length of line is nearly completed the upper end of the slide G which carries the pointer that indicates the length of line has a block $G^3$ of non-conducting material attached to it. When the line is approaching completion the top of this block comes against a light spring M which by the wire $M'$ is coupled to one pole of a battery. When the spring has in this way been raised a short distance it comes into contact with a metal arm N which at one end has a boss $N'$ upon it which can turn freely around a rod $N^2$ and at the other a weight $N^3$. The boss $N'$ is eccentric and forms a stop to prevent the weight dropping too far and normally keeps the arm N out of contact with the spring M. The rod $N^2$ is through the metallic plate $N^4$ and insulated wire $N^5$ put into electrical connection with a metallic plate $N^6$. A spring contact piece $N^7$ carried by the cover of the casing is in contact with the plate $N^6$ and through the insulated wire $N^8$ is coupled to one end of the coil $N^9$ of an electric bell. The other end of the coil is similarly coupled to a spring contact piece $N^{10}$ which bears against a plate $N^{11}$. This plate is by the insulated wire $N^{12}$ coupled to a plate $N^{13}$ against which rests a spring contact piece $N^{14}$ which is coupled to the other pole of the battery. When therefore the spring M is brought into contact with the arm N the battery circuit is completed through the coil of the electric bell and the hammer $N^{15}$ carried by the armature $N^{16}$ of the electro magnet is caused to strike the bell $N^{17}$. The armature $N^{16}$ is as best seen in Fig. $5^c$ normally held away from the electro magnet by a spring arm that carries it. When the armature is attracted the hammer $N^{15}$ strikes the bell once. Each time that the slide F is afterward raised the weighted arm N is jerked upward out of contact with the spring M and the circuit is thereby momentarily broken and then again remade when the arm drops and so the bell is again rung because, when the circuit is broken the armature is carried away from the magnet, and, when the circuit is again completed, the armature is again attracted, and the hammer thereby caused again to strike the bell. If after the line has been made of proper length the compositor still goes on adding type to the line instead of (as he ought to do) inserting the two special spaces which are to divide it from the next line as described in my former patent the slide G gets raised higher and higher until a projection $G^4$ on the insulating block $G^3$ comes against an arm $M^2$ which can turn freely around the rod that carries the spring M and consequently is in electrical connection with one pole of the battery and raises this arm against a weighted arm O. This arm is in electrical connection with the other pole of the battery through the plate $O'$, insulated wire $O^2$, plate $O^3$, spring contact piece $O^4$ and through the coil of an electro magnet $O^5$ (see Fig. 1). When the circuit is completed through the coil of this magnet the armature of the magnet is attracted and a contact piece $O^6$ which it comes against is drawn away from a fixed contact $O^7$ and so the battery circuits for the electro magnets $a$ used for delivering type from the reservoirs of the composing machine cannot be completed and no more type can be delivered into the line until the vertical slides G and K have been dropped to their zero position.

The dropping of the slides G and K is caused to take place when the two special spaces which are to divide one line from the next are delivered from the reservoirs of the composing machine in which they are held. To be able to do this the battery circuit used for delivering type from the type reservoirs must be again completed. This is done by the operator lifting the weighted arm O and holding it away from the arm $M^2$ so breaking the battery circuit through the electro magnet $O^5$ see Fig. 1 and allowing the contact pieces $O^6$ $O^7$ again to come together. At the same time the operator touches with his metallic pointer the contact plate which has to be touched to complete an electric circuit through the coil of the magnet which causes a special space to be ejected from the reservoir. As the special space is ejected a contact is made which completes an electric circuit through the coils of an electro magnet P of the indicator mechanism. The axis $P'$ of the armature of this magnet carries as is best seen in Fig. 4 an arm $P^2$ which has upon it four projections $P^3$ $P^4$ $P^5$ $P^6$. The projection $P^3$ bears against a shoulder on the arm $H^2$ which carries the roller H and forces this roller back away from the racks $G'$. The projection $P^4$ bears against the arm $F^4$ which carries the spring pawls $F^2$ and moves the pawls away from the racks so leaving the slide G free to drop and similarly the projections $P^5$ $P^6$ press back the pawls $J^3$ and $K^2$ and allow the slide K to drop. Afterward when the circuit through the coils of the magnet P is broken the armature is drawn away from the magnet by the spring $P^7$ and the several pawls return to their normal position ready to come into action for recording the length of the next line.

In place of constructing the indicator mechanism with endwise moving slides $E^5$ these slides might be made to rock on an axis $E^\times$ as indicated in Figs. 7 to 10. This allows of the magnets E being set in different planes instead of in a straight line as in Figs. 2 to 6. In these figures, $E^\times$ is an axis having mounted loosely upon it, side by side, a number of plates $e^5$, of thin sheet metal, corresponding with the slides $E^5$ of the mechanism shown in the previous figures. Each plate has in it a notch with inclined side $e^{17}$. A vertical slide $f$, having on its lower end a roller $f'$, is pressed downward by a coiled spring, so that normally the roller $f'$ rests upon the lowest part of the notch in each slide just as the roller $F'$ on the lower end of the vertical slide F was in the construction first described made to rest normally on the bottom of the inclines $E^{17}$ of the endwise moving slides $E^5$. Each plate $e^5$ has standing out from it two projections $e^{5a}$, $e^{5b}$. The projection $e^{5a}$ is drawn by a coiled spring $e^8$ in a direction to bring the projection $e^{5b}$ against a fixed stop $e^{15}$. The projection $e^{5a}$ is also by a wire coupled to an arm $e^3$, which extends from an axis $e^2$ to which is secured the armature $e'$ of an electro-magnet $e$, corresponding with the electro-magnets E, of the construction first described. $e^{16}$ are adjustable stops against which the projections $e^{5b}$ strike when the armatures are attracted by the magnets. With this construction, the action is precisely the same as in the construction first described, the only difference being that the slides $e^5$ are made to rock around an axis in place of being moved endwise like the slides $E^5$.

It is evident that the indicator may be used in conjunction with other type setting machinery whether the type are ejected from the type reservoirs by the action of electro magnets or not—as for example the type might be ejected from the type reservoirs by the contact arms $a^5$ being depressed by pressure applied to press buttons fixed on them instead of by the action of electro magnets.

What I claim is—

1. The combination of the type reservoirs mechanism for ejecting type one by one from such reservoirs and for setting them up in line—a series of movable plates ranged side by side—mechanism for moving one or other of these plates a definite distance each time that a type is ejected from one or other of the reservoirs—an incline or cam surface upon each plate—a rod held toward all the inclines by the action of a spring or gravity—a rack of ratchet teeth pawls carried by the rod engaging with this toothed rack retaining mechanism to restrain the rack from backward movement and an indicator hand carried or moved by the rack substantially as described.

2. The combination of the type reservoirs, mechanism for ejecting type one by one from such reservoirs and for setting them up in line—a series of electro magnets (one for each thickness of type used) through the coil of one or other of which an electric circuit is completed whenever a type is ejected from any reservoir.—the magnet armatures, light wires coupling these armatures to a series of plates—springs to move the plates in the opposite direction to that in which they are drawn when the armature is attracted by its magnet—stops to limit the movement of the plates—an incline or cam surface on each plate—a rod held toward all the inclines by the action of a spring or gravity—a rack of ratchet teeth pawls carried by the rod engaging with this toothed rack retaining mechanism to restrain the rack from backward movement and an indicator hand carried or moved by the rack substantially as described.

3. The combination of type reservoirs, mechanism for ejecting type one by one from such reservoirs and for setting them up in line—an electro magnet through the coil of which an electric circuit is completed whenever a type is ejected from any of the reservoirs, the magnet armature, a plate coupled by a light wire with the armature—a spring to draw the plate in the opposite direction to that in which it is drawn when the armature is attracted by the magnet, stops to limit the movement of the plate and armature—an incline or cam surface on the plate—a rod held toward the incline by the action of a spring or gravity—a rack of ratchet teeth, pawls carried by the rod engaging with this toothed rack, restraining mechanism to restrain the rack from backward movement and an indicator hand moved by the ratchet rack.

4. The combination of electro magnets E, armatures E' on axes $E^2$, arms $E^3$ on these axes, wires $E^4$ connecting these arms to plates $E^5$ having inclines upon them, springs $E^8$ drawing the plates in a direction to hold the armatures away from the magnet poles—stops to limit the movement of the plates—vertical slide F drawn downward to rest on the inclines of the plates, pawls $F^2$ carried by the slide F, slide G with racks G' of ratchet teeth upon it, soft roller H pressed against the racks and indicator hand $G^2$ moving with the slide G substantially as described.

5. The combination of electro magnets E, armatures E' on axes $E^2$, arms $E^3$ on these axes, wires $E^4$ connecting these arms to plates $E^5$ having inclines upon them, springs $E^8$ drawing the plates in a direction to hold the armatures away from the magnet poles—stops to limit the movement of the plates—vertical slide F drawn downward to rest on the inclines of the plates, pawls $F^2$ carried by the slide F, slide G with racks G' of ratchet teeth upon it, soft roller H pressed against the racks and indicator hand $G^2$ moving with the slide G—magnet P its armature on axis P', spring $P^7$ for holding the armature away from the magnet poles, arm $P^2$ extending from axis P' with projections upon it which when the armature is attracted press back the roller H and pawls $F^2$ and allow the slide G to drop to its lowest position.

6. The combination of electro magnets E, armatures E' on axes $E^2$, arms $E^3$ on these axes, wires $E^4$ connecting these arms to plates $E^5$ having inclines upon them, springs $E^8$ drawing the plates in a direction to hold the armatures away from the magnet poles— stops to limit the movement of the plates— vertical slide F drawn downward to rest on the inclines of the plates, pawls $F^2$ carried by the slide F, slide G with racks G' of ratchet teeth upon it, soft roller H pressed against the racks and indicator hand $G^2$ moving with the slide G—slide $E^{13}$ having an incline upon it and coupled to one of the plates $E^5$ vertical slide J held down toward this incline, pawls $J^3$ carried by the slide, slide K with rack K' of ratchet teeth upon it—retaining pawls $K^2$ and indicator hand $J^4$ moving with the slide K substantially as described.

7. The combination of electro magnets E, armatures E' on axes $E^2$, arms $E^3$ on these axes, wires $E^4$ connecting these arms to plates $E^5$ having inclines upon them springs $E^8$ drawing the plates in a direction to hold the armatures away from the magnet poles— stops to limit the movement of the plates— vertical slide F drawn downward to rest on the inclines of the plates, pawls $F^2$ carried by the slide F, slide G with racks G' of ratchet teeth upon it, soft roller H pressed against the racks and indicator hand $G^2$ moving with the slide G—slide $E^{13}$ having an incline upon it and coupled to one of the plates $E^5$—vertical slide J held down toward this incline— pawls $J^3$ carried by the slide, slide K with rack K' of ratchet teeth upon it—retaining pawls $K^2$ and indicator hand $J^4$ moving with the slide K—magnet P, its armature on axis P', spring $P^7$ for holding the armature away from the magnet poles—arm $P^2$ extending from axis P' with projections upon it which when the armature is attracted press back the roller H, the pawls $F^2 J^3$ and $K^2$ and allow the slides G and K to drop to their lowest positions substantially as described.

8. The combination of electro magnets E, armatures E' on axes $E^2$, arms $E^3$ on these axes, wires $E^4$ connecting these arms to plates $E^5$ having inclines upon them, springs $E^8$ drawing the plates in a direction to hold the armatures away from the magnet poles—stops to limit the movement of the plates—vertical slide F drawn downward to rest on the inclines of the plates—pawls $F^2$ carried by the slide F, slide G with racks G' of ratchet teeth upon it, soft roller H pressed against the racks and indicator hand $G^2$ moving with the slide G—contact spring M struck by the slide G when it approaches its highest position—weighted arm N against which spring M is then brought and an electric circuit thereby completed through the coil of an electric bell substantially as described.

9. The combination of electro magnets E, armatures E' on axes $E^2$, arms $E^3$ on these axes, wires $E^4$ connecting these arms to plates $E^5$ having inclines upon them springs $E^8$ drawing the plates in a direction to hold the armatures away from the magnet poles—stops to limit the movement of the plates—vertical slide F drawn downward to rest on the inclines of the plates, pawls $F^2$ carried by the slide F, slide G with racks G' of ratchet teeth upon it, soft roller H pressed against the racks and indicator hand $G^2$ moving with the slide G—contact arm $M^2$ raised by the slide G when it has been raised too high, contact arm O against which the arm $M^2$ is thereby brought, electro magnet $O^5$ through the coil of which a circuit is thereby completed—the magnet armature, contact arm $O^6$ and fixed contact $O^7$ substantially as described.

JOHN HOOKER.

Witnesses:
H. CHAMBERLIN,
*Notary Public, Great Yarmouth and Lowestoft.*
WALTER G. HOLMES,
*7 Grosvenor Road, Lowestoft, Clerk to Messrs. Chamberlin & Leech, Solicitors, Lowestoft.*